US012688056B1

(12) United States Patent
Agarwal et al.

(10) Patent No.: US 12,688,056 B1
(45) Date of Patent: Jul. 21, 2026

(54) METHOD AND APPARATUS FOR SWITCHING TIME DOMAIN ON VIRTUAL MACHINE BASED ON STATE OF PERIPHERAL DEVICE

(71) Applicant: Cadence Design Systems, Inc., San Jose, CA (US)

(72) Inventors: Prashant Vardhan Agarwal, Noida (IN); Kanwarpreet Singh Grewal, Noida (IN); Madan Kumar Nath, Noida (IN); Animesh Kumar Sinha, New Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 571 days.

(21) Appl. No.: 18/314,770

(22) Filed: May 9, 2023

(51) Int. Cl.
*G06F 9/455* (2018.01)
*G06F 1/08* (2006.01)

(52) U.S. Cl.
CPC ............ *G06F 9/45558* (2013.01); *G06F 1/08* (2013.01); *G06F 2009/45579* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 2011/0134111 A1* | 6/2011 | Stone | .................. | G06F 9/45541 |
| | | | | 345/419 |
| 2013/0218549 A1* | 8/2013 | Sultan | ................. | G06F 9/45533 |
| | | | | 703/19 |
| 2017/0315834 A1* | 11/2017 | Mikhaylov | ............... | G06F 9/52 |
| 2020/0393869 A1* | 12/2020 | August | .................... | H03B 5/32 |
| 2023/0341889 A1* | 10/2023 | Elliott | ........................ | G06F 1/14 |

* cited by examiner

*Primary Examiner* — Wynuel S Aquino
(74) *Attorney, Agent, or Firm* — Foley & Lardner LLP

(57) ABSTRACT

An emulator system and a method for emulating functionalities of an integrated circuit design are disclosed. In one aspect, the system includes a plurality of verification components each comprising circuitry configured to perform transactions with at least another verification component. The system can include a plurality of proxies, each executing on a processor and corresponding to a respective one of the verification components. The system can include a switch that is communicatively coupled with the proxies, the switch dynamically configurable to, in a first time duration, operate with a first subset of the proxies to enable a first transaction between a functional module of the design and a first verification component. The switch can be dynamically configurable to, in a second time duration, operate with a second subset of the proxies to enable a second transaction between the functional module and a second verification component.

20 Claims, 5 Drawing Sheets

<u>200</u>

100

300

500

METHOD AND APPARATUS FOR SWITCHING TIME DOMAIN ON VIRTUAL MACHINE BASED ON STATE OF PERIPHERAL DEVICE

TECHNICAL FIELD

The present disclosure generally relates to systems and methods for clock adjustment on a virtual machine of a host device, including but not limited to a clock adjustment of a virtual machine executed on a host device based on a state of clock of an emulator executed on a remote server.

BACKGROUND

Verification is an integral aspect of developing electronic circuits and circuit boards. When testing a functional design, it is helpful to be able to test the design's connections and communications with other components in hardware so that the designer can validate that the functional design can work and meet technical standards. Testing can be achieved using a virtual machine in communication with an emulator testing a circuit on a server device. However, maintaining synchronization between two remote systems can be difficult when time-consuming and resource-intensive tasks are executed by the interconnected devices.

SUMMARY

The present disclosure is directed to a solution for synchronizing the timing (e.g., clock) of an emulator executed on a remote server with the timing (e.g., clock) of a virtual machine (VM) of a host system based on a change in the state of the emulator timing circuit. When an emulator executed on a server performs a series of operations for testing, verifying or emulating various functionalities of a circuit design under test (DUT), a VM on a host device can rely on its internal VM clock to remain in sync with the emulator. However, as the emulator can encounter different any number of time-consuming or resource-intensive tasks, such as for example a read memory operation that can cause the emulator to temporarily stop or pause the emulation process (or the communication with the VM via a virtual bridge channel), the simulation clock of the emulator can fall out of sync with the clock of the VM. This can cause an error at the VM side of the system as the emulator may not respond to the requests of the VM within a designated time. The present solution overcomes such challenges by allowing the timing circuit (e.g., clock) of the VM to adjust (e.g., slow down) in response to a notification that the state of the emulator's timing circuit has changed (e.g., from an active/running state to a stopped/paused state). In doing so, the present solution allows the VM to adjust its clock rate to compensate for the changes in the state of the emulator clock, thus maintaining the sync between the emulator and the VM, even when the emulator encounters time-consuming or resource-intensive tasks causing delay in other VM operations.

In some aspects, the present solution relates to a system to adjust a clock of a virtual machine based on a clock of an emulator. The system can include at least one processor coupled with memory and configured to provide, for a virtual machine on a host device, a clock of the virtual machine to perform a plurality of operations of the virtual machine at a first rate of time. The at least one processor can be configured to receive, by the host device from a server executing an emulator, a notification indicating a state of a clock of the emulator. The at least one processor can be configured to adjust, by the virtual machine responsive to the state, the clock of the virtual machine to a second rate of time lower than the first rate of time. The at least one processor can be configured to perform, by the virtual machine, a subset of the plurality of operations of the virtual machine at the second rate of time.

The first rate of time can be according to a clock of the host device used to perform operations of the host device. The clock of the emulator can be used to perform operations of the emulator on a test circuit. The second rate of time can be at least ten times lower than the first rate of time. The state of the clock of the emulator can be one of a paused clock of the emulator or a stopped clock of the emulator.

The at least one processor can be configured to receive, by the virtual machine from an emulator, a second notification. The second notification can indicate a second state of the clock of the emulator. The second state can correspond to the clock of the emulator being resumed. The at least one processor can be configured to adjust, by the virtual machine responsive to the second state, the clock of the virtual machine to the first rate of time. The at least one processor can be configured to perform, by the virtual machine, a second subset of the plurality of operations of the virtual machine at the first rate of time.

The at least one processor can be configured to receive, by the virtual machine from an emulator, a second notification. The second notification can indicate a second state of the clock of the emulator. The second state can correspond to the clock of the emulator being resumed. The at least one processor can be configured to adjust, by the virtual machine responsive to the second state, the clock of the virtual machine to a third rate of time higher than the first rate of time. The at least one processor can be configured to perform, by the virtual machine, a second subset of the plurality of the operations of the virtual machine at the third rate of time.

The at least one processor can be configured to determine, by the virtual machine, that a count of the clock of the virtual machine operating at the third rate of time has reached a count of the clock of the host device operating at the first rate of time. The at least one processor can be configured to adjust, by the virtual machine responsive to the determination, the clock of the virtual machine to the first rate of time. The at least one processor can be configured to perform, by the virtual machine, a third subset of the plurality of the operations of the virtual machine at the first rate of time.

The clock of the virtual machine can be configured to perform the plurality of operations for a test function of the virtual machine corresponding to a test circuit emulated by the emulator on the server. The at least one processor can be configured to transmit, by the virtual machine via a channel established between the host device and the server, an instruction for the emulator to read a value stored in a memory of the server. The at least one processor can be configured to receive, by the virtual machine from the server, the value via the channel.

The at least one processor is configured to transmit, by the virtual machine, an instruction for the emulator to read a value stored in a memory of the server. The at least one processor is configured to receive, by the virtual machine from the server, the notification from the server responsive to a determination that the instruction is for a blocking transaction.

In some aspects, the present solution relates to a method of adjusting a clock of a virtual machine based on a clock of an emulator. The method can include one or more processors of virtual machine coupled with memory of a host device providing a clock of the virtual machine to perform a plurality of operations of the virtual machine at a first rate of time. The method can include the one or more processors receiving from a server executing an emulator, a notification indicating a state of a clock of the emulator. The method can include the one or more processors adjusting, by the one or more processors responsive to the state, the clock of the virtual machine to a second rate of time lower than the first rate of time. The method can include the one or more processors performing, by the one or more processors, a subset of the plurality of operations of the virtual machine at the second rate of time.

The first rate of time can be according to a clock of the host device used to perform operations of the host device. The clock of the emulator can be used to perform operations of the emulator on a test circuit. The state of the clock of the emulator can be one of a paused clock of the emulator or a stopped clock of the emulator.

The method can include the one or more processors receiving from an emulator a second notification indicating a second state of the clock of the emulator, the second state corresponding to the clock of the emulator being resumed. The method can include the one or more processors adjusting, responsive to the second state, the clock of the virtual machine to the first rate of time. The method can include the one or more processors performing a second subset of the plurality of operations of the virtual machine at the first rate of time.

The method can include the one or more processors receiving, from an emulator, a second notification indicating a second state of the clock of the emulator. The second state can correspond to the clock of the emulator being resumed. The method can include the one or more processors adjusting, responsive to the second state, the clock of the virtual machine to a third rate of time higher than the first rate of time. The method can include the one or more processors performing a second subset of the plurality of the operations of the virtual machine at the third rate of time.

The method can include the one or more processors determining that a count of the clock of the virtual machine operating at the third rate of time has reached a count of the clock of the host device operating at the first rate of time. The method can include the one or more processors adjusting, responsive to the determination, the clock of the virtual machine to the first rate of time. The method can include the one or more processors performing a third subset of the plurality of the operations of the virtual machine at the first rate of time.

The clock of the virtual machine can be configured to perform the plurality of operations for a test function of the virtual machine corresponding to a test circuit emulated by the emulator on the server. The method can include the one or more processors transmitting, via a channel established between the host device and the server, an instruction for the emulator to read a value stored in a memory of the server. The method can include the one or more processors receiving, from the server, the value via the channel. The method can include the one or more processors transmitting an instruction for the emulator to read a value stored in a memory of the server. The method can include the one or more processors, receiving, from the server, the notification from the server responsive to a determination that the instruction is for a blocking transaction.

In some aspects, the present solution relates to a non-transitory computer readable medium storing program instructions. The instructions can be for causing at least one processor to provide, for a virtual machine on a host device, a clock of the virtual machine to perform a plurality of operations of the virtual machine at a first rate of time. The instructions can be for causing the at least one processor to receive, by the host device from a server executing an emulator, a notification indicating a state of a clock of the emulator. The instructions can be for causing the at least one processor to adjust, by the virtual machine responsive to the state, the clock of the virtual machine to a second rate of time lower than the first rate of time. The instructions can be for causing the at least one processor to perform, by the virtual machine, a subset of the plurality of operations of the virtual machine at the second rate of time.

The first rate of time can be according to a clock of the host device used to perform operations of the host device. The clock of the emulator can be used to perform operations of the emulator on a test circuit. The state of the clock of the emulator can be one of a paused clock of the emulator or a stopped clock of the emulator.

BRIEF DESCRIPTION OF THE DRAWINGS

These and other aspects and features of the present embodiments will become apparent to those ordinarily skilled in the art upon review of the following description of specific embodiments in conjunction with the accompanying figures.

DETAILED DESCRIPTION

Figure 1:
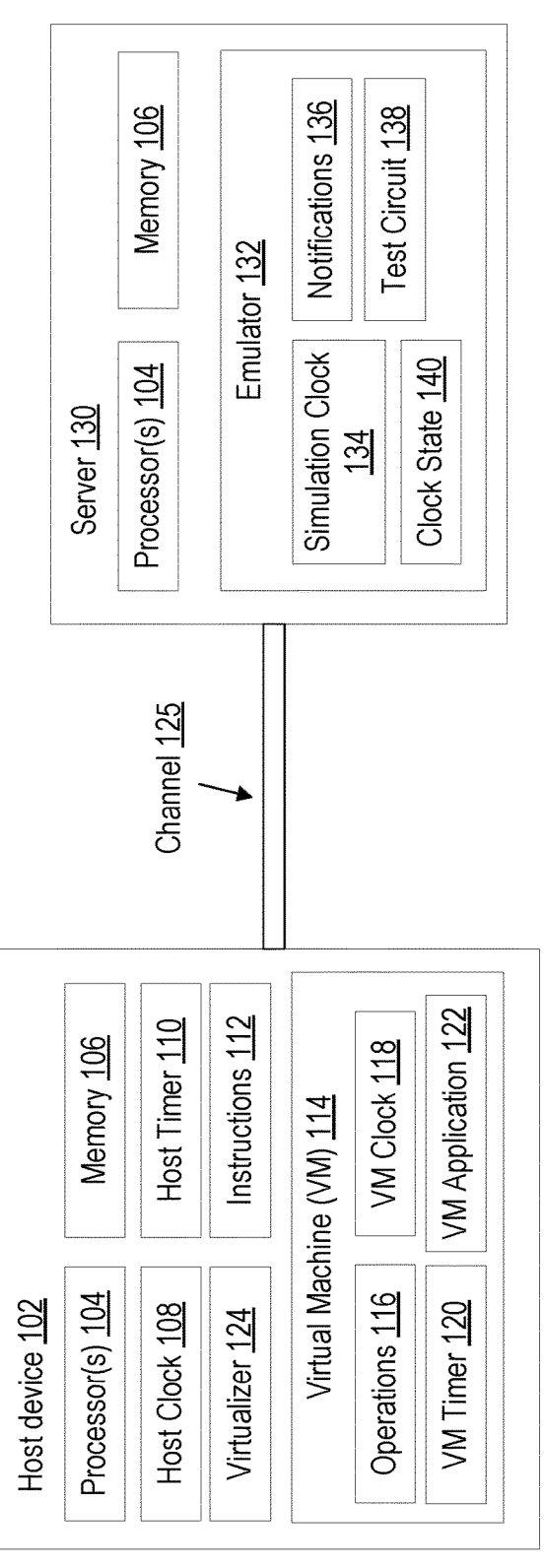
FIG. 1 is an example block diagram of an emulation system, according to some embodiments.

The present embodiments shall now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments shall be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Embodiments of the systems and methods disclosed herein relate to an emulation system in which the clock of a VM interacting with an emulator is adjusted based on the changes in the timing/clock state of the emulator so as to maintain the synchronization between the VM and the emulator as the emulator processes time-consuming or resource-intensive tasks. Typically, an emulator on a server coordinates interactions or operations with a VM on a host device using the local timing circuits (e.g., clocks) of the two respective machines. However, when the emulator encounters a task that is more time-consuming or resource-intensive than others, the emulator can fall out of sync with the VM, causing an error. For example, if the VM, during an emulation process, sends to the emulator a read memory instruction causing the emulator to temporarily stop or pause the emulation process, the emulator may take longer than expected by the VM to reply, and the VM time for receiving the response may time out. The present solution can overcome this challenge by causing the timing circuit (e.g., clock) of the VM to adjust (e.g., slow down with respect to the clock of the host machine) in response to a notification that the state of the emulator's timing circuit has changed to a state of a stopped or paused clock. Likewise, the present solution can also adjust the VM clock to catch up to the clock of the host machine when the emulator continues to operate at its normal (e.g., not paused) clock cycle.

FIG. 1 is a block diagram of an emulation system 100, according to some embodiments. The emulation system 100 can a host device 102 (e.g., a user device) communicating with a remote server 130 via a channel 125. The host device 102 can include one or more processors 104, memories 106, host clocks 108, host timers 110, instructions 112 and virtualizers 124. The host device 102 can also include one or more virtual machine (VM) 114, each of which can include one or more operations 116, VM clocks 118, VM timers 120 and VM applications 122. Server 130 can include one or more processors 104, memories 106 and emulators 132. Emulator 132 can include one or more simulation clocks 134, notifications 136, test circuits 138 and clock states 140.

The host device 102 can include a computing device such as computer (or workstation). The host device 102 can provide a user with a VM application 122 which the user can use to access the emulator 132 to test the functionality of a test circuit 138 (e.g., DUT). The user can enter/provide (e.g., type in) instructions 112 into the host device 102 which may be sent (e.g., via the VM application 122) to the emulator 132 on the remote server 130.

The processor(s) 104 can include any processing circuit or a system, such as a processor, that executes the software command(s) that the user can input into the host device 102. For example, the processor 104 can utilize instructions or commands stored in memory 106 to execute or operate a VM 114, generate and provide instructions 112 for emulator 132 and utilize the host timer 110 to interact with host clocks 108. The processor 104 can execute one or more virtualizers 124 to allow one or more VMs 114, and their operating systems, to run on the host device 102. The processor 104 can execute a VM application 122 to interact with the emulator 132, implement operations 116 of the VM 114, and utilize the VM timer 120 to adjust or manage the VM clock 118. The processor 104 can execute the functionalities of the channel 125 to provide a facilitate a communication and interaction with the server 130 and the emulator 132.

Memory 106 can include any one or more devices or circuits for storing information or data. Memory 106 can include static or dynamic memory, storage memory devices or processing memory. Memory 106 can include a read a random access memory (RAM), dynamic RAM (DRAM), static RAM (SRAM), synchronous DRAM (SDRAM), double data rate (DDR) DRAM or any other type of RAM memory. Memory 106 can include read only memory (ROM), programmable ROM (PROM), erasable PROM (ERPOM), electrically erasable PROM (EEPROM), or any other type of ROM memory. Memory 106 can include a flash memory, a cache memory of a processor 104, hard drives or any other type of device storing data and providing access to stored data.

Host clock 108 can include any timing circuit (e.g., clock or a clock signal) for synchronizing actions or processes of a digital circuit, such as a processor 104. Host clock 108 can include a signal oscillating between a high state and a low state and can be used for driving step by step operations 116 of the VM 114 or host device 102. Host clock 108 can be monitored or managed by a host timer 110, also referred to as the host timing circuit 110, which can receive requests from the VM 114 (e.g., VM timer 120) and provide responses, such as for example the timing of the host clock 108. Host timer 110 can receive and forward notifications 136 from the emulator 132 on the clock state 140 of the emulator. Host timer 110 can monitor the clock 108 and provide the updates (e.g., the current state) of the host clock 108 to the VM 114 or its virtualizer 124 (e.g., Quick Emulator or QEMU).

Virtualizer 124 can include any machine virtualizer or emulator for running one or more operating systems for one or more virtual machines 114. Virtualizer 124 can include a machine emulator, such as an open source Quick Emulator (QEMU). Virtualizer 124 can be an interface between the VM 114 and the host device 102. Virtualizer 124 can be functionally considered a part of the VM 114 and a part of the host device 102. Virtualizer 124 can emulate a machine processor through a dynamic binary translation and provide one or more hardware and device models to run VMs 114. Virtualizer 124 can include the functionality for interacting with a VM timer 120 and updating the VM clock 118. For example, virtualizer 124 can collaborate with a VM timer 120 to adjust a VM clock 118 based on notifications 136 indicative of a changed clock state 140 at the emulator 132. Virtualizer 124 can include the functionality of a VM timer 120 to monitor, control or adjust the VM clock 118 based on notifications 136 of the emulator 132.

Instructions 112 can include any one or more instructions from a host device 102 (e.g., VM 114) to an emulator 132. An instruction 112 can include an instruction or command from a VM 114 to the emulator 132. Instruction 112 can include an instruction for a non-blocking transaction, such as, for example, an instruction to write to a memory. When an instruction 112 for a non-blocking transaction is sent (e.g., write to memory instruction), the emulator 132 can implement the requested instruction without blocking the channel 125 during the operation. Instruction 112 can include an instruction for a blocking transaction, such as, for example, an instruction to read from memory. When an instruction 112 for a blocking transaction is sent (e.g., read from memory instruction), the emulator 132 can block the channel 125 during the execution of the instruction. Blocking the channel 125 during the execution of such a blocking instruction can cause a pause in the emulator processing, leading to the timing between the emulator 132 and the VM 114 to fall out of sync. For example, when an instruction 112 for a blocking transaction is implemented, the channel 125 can be blocked and the emulator 132 can pause/stop emulation processing. The emulator 132 can then switch its clock state 140 from an active state to a paused/stopped state, which can cause the emulator 132 to send a notification 136 to the VM 114, causing the VM 114 to adjust (e.g., slow down) its VM clock 118 to compensate for the stopped processing at the emulator 132.

Virtual machine (VM) 114 can include any virtualization or emulation of a computing system, which can run on a virtualizer 124 and be executed by a host device 102. VM 114 can include a compute resource executed by one or more processors 104 on a host device 102 and include virtualized computing environment providing the functionality of a physical computer. VM 114 can include its own operating system that is separate from the operating system of the host device 102. VM 114 can include VM clock 118 that is the same as, or different from, the host clock 108. VM clock 118 can be based on host clock 108 and can be scaled (up or down) from the host clock 108. VM 114 can execute one or more VM applications 122 for running emulator 132 functionalities on a test circuit 138 (e.g., DUT).

VM clock 118 can include any timing circuit (e.g., clock or a clock signal) for synchronizing actions or processes of a VM 114. VM clock 118 can include a signal oscillating between a high state and a low state and can be used for driving operations 116 of the VM 114. VM clock 118 monitored, adjusted, controlled or managed by a VM timer 120, also referred to as the VM timing circuit 120. VM timer 120 can receive requests (e.g., sync time events) from a VM application 122 and send check time requests to the virtualizer 124 or the host timer 110 to check the timing of the host clock 108. VM timer 120 can receive from the virtualizer 124 and/or host timer 110 responses to check time requests (e.g., current time status) and can operate the VM 114 accordingly.

VM timer 120 can include the functionality to adjust the VM clock 118, individually or along with the virtualizer 124, so as to slow down or speed up the VM clock 118 with respect to the host clock 108. For example, VM timer 120 can include the functionality to receive a notification 136 from emulator 132 that the clock state 140 of the emulator 132 is switched from an active/running state to a paused/stopped state. In response to the notification 136, VM timer 120 can reduce the speed of the VM clock 118 with respect to the time rate of the host clock 108 to a fraction of the time rate of the host clock 108, such as up to 95%, 90%, 80%, 85%, 70%, 75%, 60%, 50%, 40%, 30%, 20%, 10%, 5% or 1% of the timing rate of the host clock 108. For example, VM timer 120 can include the functionality to receive a notification 136 from emulator 132 that the clock state 140 of the emulator 132 is switched from a paused/stopped state to an active/running state. In response to the notification 136, VM timer 120 can increase the speed of the VM clock 118 with respect to the time rate of the host clock 108, such as up to 1%, 5%, 10%, 20%, 30%, 40%, 50%, 60%, 70%, 80%, 90%, 100%, 150%, 200%, 400% or more than 400% of the timing rate of the host clock 108.

VM application 122 can include any application for communicating or interacting with the emulator 132. VM application 122 can include functionality for allowing a user to run an emulator 132 on the server 130. VM application 122 can allow the user to generate, enter, provide or send instructions, such as instructions 112, to the emulator 132. Instructions (e.g., 112) can include commands, data or parameters for emulating test circuit 138, read data, write data, or perform any other functionality associated with testing or emulating test circuit 138. VM application 122 can establish communicate with the emulator 132 via a channel 125.

Channel 125 can include any communication channel between the host device 102 and server 130. Channel 125 can include a virtual interface to connect to an outside network through a physical interface. Channel 125 can include to a dedicated port to each of the endpoint devices and can include clients agents for facilitating the connection. Channel 125 can be established between the host device 102 and the server 130, or between a VM 114 and the emulator 132. Channel 125 can include or be integrated with one or more peripheral component interconnect express (PCIe) to provide an interface for high-speed connectivity. For example, channel 125 can include a virtual bridge client on a host device 102 to act as a client agent facilitating the channel 125 connection on the host device side of the channel 125 to the VM 114. For example, channel 125 can include a virtual bridge client on the server 130 to act as a server-side agent facilitating the channel 125 connection to the emulator 132. The virtual bridge client and/or virtual bridge server can include or provide a virtual router or firewall. Channel 125 can include the virtual bridge server including or interfacing with an accelerated verification intellectual property (AVIP) to enable accelerated testing or emulating of the test circuit 138.

Server 130 can include any combination of hardware and software executing an emulator 132. Server 130 can include the functionality (e.g., channel 125 and its server-side components) for communicating with the host device 102 and allowing a user on the host device 102 to interact with (e.g., send instructions 112 to) the emulator 132. Server 130 can receive and send communications or data through the channel 125. Server 130 can utilize its own one or more processors 104 and instructions or data stored in memory 106 to execute or run emulator 132 or any server-side functionality of channel 125.

Emulator 132 can include any combination of hardware and software for testing, validating, behaving or acting as, or otherwise performing emulation of, a test circuit 138 (DUT). Test circuit 138 can be any representation of a DUT, such as a register transfer level (RTL) design of a test circuit, a processor, a microcontroller, a field programmable gate array (FPGA), a system-on-chip (SoC), an application specific integrated circuit (ASIC), one or more subsystems and/or IP blocks. Emulator 132 can test or emulate any functionality of a test circuit 138, such as, for example a data processing circuitry, input or output circuitry, wireless communication circuitry and/or correct implementations of a communication protocol. Emulator 132 can compile and process different test designs in the test circuits 138, including import or map to a synthesized test designs, to operate, communicate, or interact with built-in verification components to test a functional test circuits 138. The emulator 132 can include a variety of hardware components such as processor(s), FPGA(s), dedicated components such as ASIC, and/or other devices that can be used to run emulations of a test circuit 138, e.g., to test/verify the functionality of the DUT.

Simulation clock 134 can include any signal or a variable within an emulator 132 providing the current value of the simulated time during the testing, validation or emulation of a test circuit 138. Simulation clock 134 can include a value or parameter corresponding to a clock time at a particular testing stage of the test circuit 138. Simulation clock 134 can be synchronized (e.g., equal to, at the rate with, or in correlation with) a VM clock 118 or host clock 108. Simulation clock 134 can be out of sync (e.g., faster than or slower than) a VM clock 118 or host clock 108. Simulation clock 134 can correspond to a stage in the simulation or emulation of a test circuit 138 and can be disconnected from the real time (e.g., host clock 108) and can run faster than the host clock 108 of the VM clock 118 or slower than the host clock 108 or the VM clock 118.

Notification 136 can include any notification or a message indicative of the clock state 140. Clock state 140 can correspond to a state of the simulation clock 134. Notification 136 can indicate that the clock state 140 of the simulation clock 134 is an active/running state or is a paused/stopped state. For example, notification 136 can include indicate that the clock state 140 of the simulation clock 134 has changed from an active or running state (e.g., in line, at the rate with, or in correlation with the host clock 108 or VM clock 118) to a paused or stopped state (e.g., when the simulation clock 134 is stopped). The simulation clock 134 can be stopped, for example, when the emulator 132 has to implement a blocking transaction (e.g., a read to memory instruction) that can block the channel 125 for a period of time. Notification 136 can include an indication that the clock state 140 of the simulation clock 134 has changed from a stopped or paused state back to a running or active state. An active or running clock state 140 of the simulation clock 134 can correspond to a timing or processing rate of the host clock 108 or VM clock 118. A paused or stopped clock state 140 of the simulation clock 134 can correspond to the simulation clock 134 being stopped for a period of time, such as one or more milliseconds (ms), up to 5 ms, 10 ms, 20 ms, 50 ms, 100 ms, 500 ms, 1 second(s), 5 s, 10 s, or more than 10 s.

In some aspects, the emulator system 100 relates to a VM 114 executing on a host device 102 running a test on a test circuit 138 via an emulator 132 on a remote server 130. For example, a user can utilize a VM application 122 to test a particular test circuit 138 with the emulator 132, communicating with the emulator via the channel 125 (e.g., virtual bridge client, channel, virtual bridge server and/or AVIP). The test cases on the VM 114 can generate or provide protocol data (e.g., PCIe, read, write or configuration reads) that can be communicated over the virtual bridge channel 125 from the VM 114 to the emulator 132 and/or test circuit 138, and vice versa.

Test cases can include, for example, PCIe memory read and memory write instructions (e.g., transactions) that are blocking or non-blocking. For example, read memory transactions (e.g., READ_MEM) can be blocking while write memory transactions (e.g., WRITE_MEM) can be non-blocking. In some embodiments, blocking and non-blocking transactions can vary, based on the implementation of the emulator 132, VM 114 and/or channel 125.

For example, when a read memory transaction is initiated, the execution of this transaction can cause the channel 125 to be blocked in order to receive back the response from the test circuit 138 to the VM 114. In some embodiments, the channel 125 is blocked because in PCIe, specific ordered instructions 112 or transactions have to be transmitted and/or received in order, thereby stopping the remainder of the emulation during this time.

However, the VM 114 can have a pre-defined time for which the response to the read memory instruction 112 (e.g., transaction) should arrive back to the VM 114. When the response does not arrive in time, the VM 114 can generate a timeout error, which can be reported to the operating system of the VM 114 for that specific transaction. Such delays in response time can be caused, for example, when the emulator 132 receives the instruction 112 for a blocking transaction when it starts doing a miscellaneous task (e.g., completing a waveform dumping of the data). In such instances, a timeout error is more likely to occur-which can be prevented by the present solution.

For example, when an emulator 132 receives from the VM application 122 an instruction 112 to perform a blocking transaction, the emulator 132 can stop its simulation clock 134 and complete its miscellaneous task. In response to its stopped simulation clock 132, a notification 136 can be sent to the VM 114 to indicate that the clock state 140 of the simulation clock 134 switched from active/running state to stopped/paused state. VM 114 can then, in response to the notification, utilize the VM timer 120 and/or virtualizer 124 to slow down or reduce the time rate of its VM clock 118 with respect to the host timer 110. While the clock state 140 of the simulation clock 134 remains in the stopped/paused state, the VM application 122 and its operations 116 (e.g., instructions 112 or VM application tasks) can execute at the reduced or slower rate of the VM clock 118.

When the emulator 132 completes the blocking transaction/task and the channel 125 is once again unblocked, the emulator 132 can send another notification 136 indicating to the VM 114 that the clock state 140 of the simulation clock 134 is now again active/running. In response to the new notification 136, the VM 114 can resume or increase its VM clock 118 with respect to the host clock 108. In some embodiments, the VM clock 118 can be set back to the time rate of the host clock 108, or it can be set to a rate higher (e.g., faster) than the host clock 108 for a period of time until the clock count of the VM clock 118 reaches the clock count of the host clock 108. In some embodiments, the simulation clock 134 can be coordinated (e.g., equal) with the VM clock 118 to ensure that the emulator 132 processing is coordinated with the VM clock 118. For example, as the VM clock 118 is decreased or increased, the VM clock 118 is maintained at or around the clock rate of the simulation clock 134 with respect to the emulation of the test circuit 138.

Figure 2:
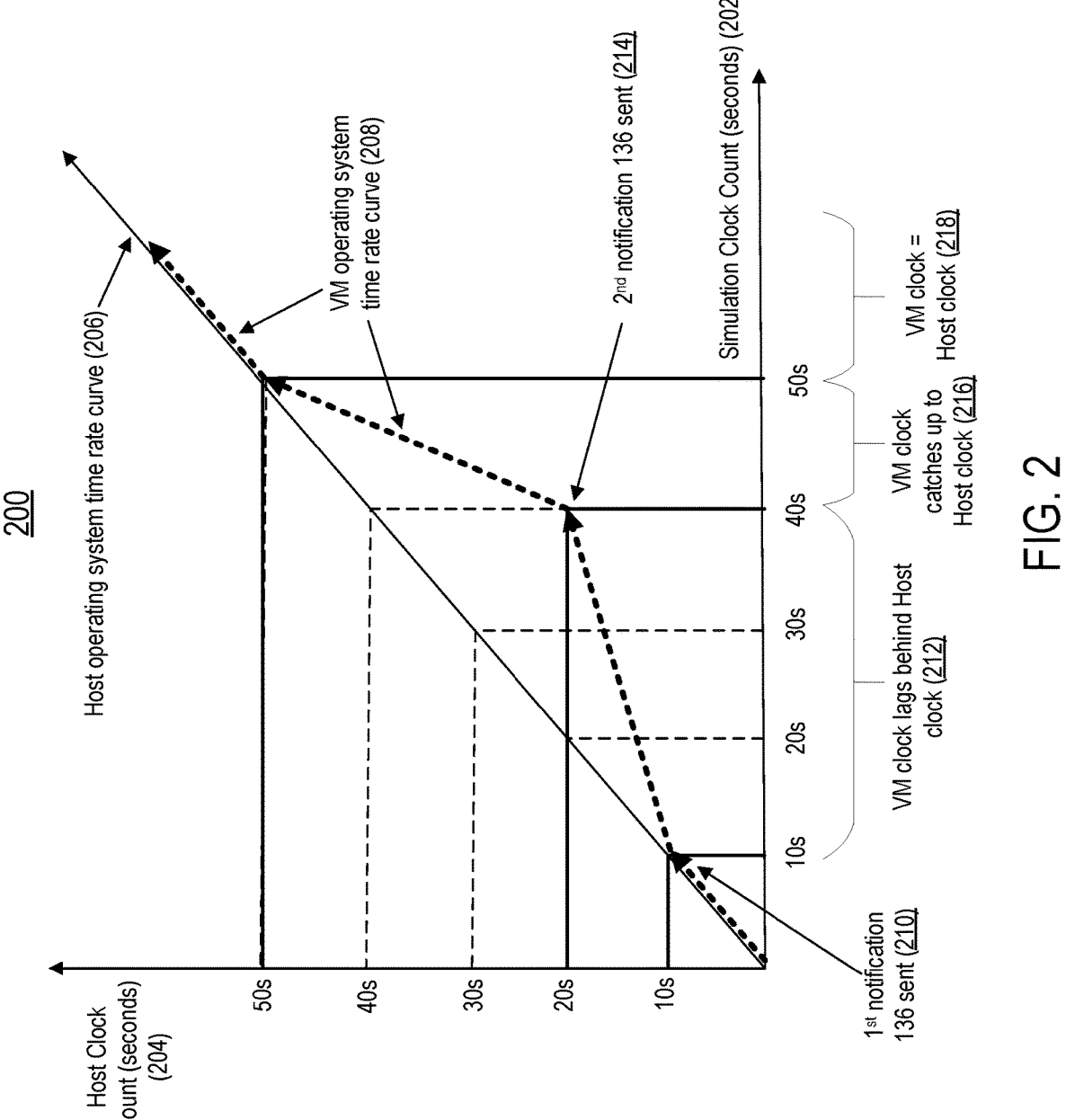
FIG. 2 is an example plot of a virtual machine clock rate and a host clock rate when adjusted based on emulator state changes, according to some embodiments.

FIG. 2 illustrates an example plot 200 of a virtual machine 114 clock rate and a host device 102 clock rate when adjusted based on clock states 140 of the simulation clock 134. Plot 200 includes an X-axis corresponding to a simulation clock count 202 (in seconds) and a Y-axis corresponding to a host clock count 204 (in seconds). A host operating system (OS) time rate curve 206 is indicated as a sloped straight line at a slope of Y=X (e.g., host clock count 204 is equal to simulation clock count 202). Also illustrated on the plot 200 is the VM OS time rate curve 208. VM OS time rate curve 208 can correspond to the cumulative count of the VM clock 118, just as Host OS time rate curve 206 can correspond to the cumulative count of the host clock 108.

Plot 200 shows how the VM OS time rate curve 208 diverges and converges with respect to the host OS time rate curve 206 in response to notifications 136 being sent from the emulator 132. In the plot 200, during the first 10 seconds of the processing, the host OS time rate curve 206 (indicated by the thin, straight X=Y arrow) and the VM OS time rate curve 208 (indicated by the thick dotted arrow) are aligned together, having the same slope and operating at the same rate (e.g., the host clock 108 and the VM clock 118 are equal and/or synchronized).

At second 10, plot 200 illustrates an event 210 when the first notification 136 is sent from the emulator 132 to the VM 114. At that point (e.g., second 10), VM 114 reduces the rate of the VM clock 118 to a rate that is lower than that of the host clock 108. The host clock 108 continues at the same unchanged rate, while the VM clock 118 operates a lower slope, as indicated by a second thick dotted arrow starting from second 10 up until second 40 on the simulation clock count 202 axis. The time period from second 10 to second 40 on the simulation clock count 202 is marked as the region 212 during which VM clock 118 lags behind the Host clock 108. As a result of this divergence, at second 40 of the simulation clock count 202, the host clock count 204 (e.g., cumulative clock count of host clock 108) is at a second 40 at the axis 204, while the VM clock count (e.g., cumulative clock count of VM clock 118) is at second 20 of the axis 204 (e.g., with respect to the host clock count). In the illustrated example, between the seconds 10 and 40 on the simulation clock count 202 axis, the VM clock 118 advanced only 10 seconds of the host clock 108 (e.g., from 10s to 20s of the Host clock count 204 axis), while the host clock 108 advanced from 30 second (e.g., from 10s to 40s of the host clock count 204 axis).

Plot 200 also illustrates an event 214 at which a second notification 136 is sent. The second notification 136 can indicate that the simulation clock 134 is again active. In response to the second notification 136, VM 114 can adjust the VM clock 118 to a rate that is faster than the host clock in order for the total VM clock count (and the simulation clock count) to catch up with the host clock count. As a result, in the region 216, the VM clock 118 catches up to the host clock 108 (e.g., runs at a rate faster than the host clock 108) so that between the seconds 40 and 50 of the simulation clock count 202, the thick dotted line indicating the VM OS time rate curve 208 reaches the host OS time curve rate 206 at second 50 of the simulation clock count 202. At that point (e.g., the second 50 of the simulation clock count 202), the cumulative count of the simulation clock 134 and the cumulative clock of the VM 118 can catch up and match with the cumulative clock of the host clock 108.

At region 218, once the VM clock 118 catches up with host clock 108 at second 50 of the simulation clock count 202, the VM clock 118 can continue operating at a rate that is equal to the rate of the host clock 108. The two (e.g., the two clocks operate at the same rate), and continuing to perform at a rate of Y=X (e.g., simulation clock count 202 is equal to the host clock count 204).

In some aspects, the present solution relates to a system 100 for adjusting a clock 118 of a virtual machine based on a clock 134 of an emulator 132. The system 100 can include at least one processor 104 coupled with memory 106 and configured to provide, for a virtual machine 114 on a host device 102, a clock 118 of the virtual machine 114 to perform a plurality of operations 116 of the virtual machine 114 at a first rate of time. For example, the operations 116 can include any range of operations for testing, verifying or emulating the test circuit 138 (e.g., DUT) at the emulator 132 executed on a server 130. The system 100 can also include at least one processor 104 coupled with memory 106 and configured to receive, by the host device 102 from a server 130 executing an emulator 132, a notification 136 indicating a state 140 of a clock 134 of the emulator 132. The system 100 can include at least one processor 104 coupled with memory 106 and configured to adjust, by the virtual machine 114 responsive to the state 140, the clock 118 of the virtual machine to a second rate of time lower than the first rate of time. For example, the second rate can be a clock rate that is lower than a rate of the host clock 108 of the host device 102. The system 100 can include at least one processor 104 coupled with memory 106 and configured to perform, by the virtual machine 114, a subset of the plurality of operations 116 of the virtual machine 114 at the second rate of time (e.g., the lower clock rate).

The first rate of time can be according to a clock 108 of the host device 102, which can be used to perform operations of the host device 102. The first rate of time can be according to the clock 134 of the emulator 132 which can be used to perform operations of the emulator 132 on a test circuit 138. The second rate of time can be, for example, at least ten times lower than the first rate of time. The second rate of time can be, for example, at least twenty, fifty, or hundred times lower than the first rate of time. The state of the clock 134 of the emulator 132 can be one of a paused clock of the emulator 132 or a stopped clock of the emulator 132.

The system 100 can include at least one processor 104 coupled with memory 106 and configured to receive, by the virtual machine 114 from an emulator 132, a second notification 136. The second notification 136 can indicate a second state 140 of the clock 134 of the emulator 132. The second state can correspond to the clock 134 of the emulator 132 being resumed. For example, the emulator clock 134 (e.g., simulation clock 134) can be set at an active or running state. The at least one processor 104 can be configured to adjust, by the virtual machine 114, responsive to the second state 140, the clock 118 of the virtual machine 114 to the first rate of time. The at least one processor 104 can be configured to perform, by the virtual machine 114, a second subset of the plurality of operations 116 of the virtual machine 114 at the first rate of time.

The system 100 can include at least one processor 104 coupled with memory 106 and be configured to receive, by the virtual machine from an emulator, a second notification indicating a second state of the clock of the emulator 132. The second state 140 can correspond to the clock 134 of the emulator 132 being resumed. The at least one processor 104 can be configured to adjust, by the virtual machine 114 responsive to the second state 140, the clock 118 of the virtual machine to a third rate of time. The third rate of time can be higher than the first rate of time. For example, the VM clock 118 can be adjusted to a rate that is up to 1.5, 2, 3, 5, 10, 20, 30, 40, 50, 100, or more than 100 times the rate of the host clock 108. The at least one processor 104 can be configured to perform, by the virtual machine 114, a second subset of the plurality of the operations 116 of the virtual machine 114 at the third rate of time (e.g., a higher clock rate than that of the host clock 108).

The system 100 can include at least one processor 104 coupled with memory 106 and be configured to determine, by the virtual machine 114, that a count of the clock 118 of the virtual machine operating at the third rate of time has reached a count of the clock 108 of the host device operating at the first rate of time. For example, a cumulative count of the VM clock 118 can reach the cumulative count of the host clock 108. The at least one processor 104 can be configured to adjust, by the virtual machine 114 responsive to the determination that the VM clock 118 count has reach the host clock 108 count, the clock 118 of the virtual machine to the first rate of time (e.g., the rate of the host clock 108). The at least one processor 104 can be configured to perform, by the virtual machine 114, a third subset of the plurality of the operations 116 of the virtual machine 114 at the first rate of time (e.g., host clock 108 time rate).

The clock of the virtual machine 114 can be configured to perform the plurality of operations 116 for a test function (e.g., operation 116) of the virtual machine 114 corresponding to a test circuit 138 emulated by the emulator 132 on the server 130. The at least one processor 104 can be configured to transmit, by the virtual machine 114 via a channel 125 established between the host device 102 and the server 130, an instruction 112 for the emulator 132 to read a value stored in a memory 106 of the server 130. The at least one processor 104 can be configured to receive, by the virtual machine 114 from the server 130, the (requested) value via the channel 125.

The system 100 can include at least one processor 104 coupled with memory 106 and be configured to transmit, by the virtual machine 114, an instruction 112 for the emulator 132 to read a value stored in a memory 106 of the server 130. The at least one processor 104 can be configured to receive, by the virtual machine 114 from the server 130, the notification 136 from the server 130 responsive to a determination that the instruction 112 is for a blocking transaction, such as a transaction to read a memory value.

In some aspects, the present solution relates to a non-transitory computer readable medium storing program instructions. The program instructions can be stored in memory 106 of the host device 102 or a server 130. The program instructions can be for causing at least one processor 104 to provide, for a virtual machine 114 on a host device 102, a clock 118 of the virtual machine to perform a plurality of operations 116 of the virtual machine 114 at a first rate of time (e.g., a rate of host clock 108). The program instructions can be for causing at least one processor 104 to receive, by the host device 102 from a server 130 executing an emulator 132, a notification 136 indicating a state 140 of a clock 134 of the emulator 132. The program instructions can be for causing at least one processor 104 to adjust, by the virtual machine 114 responsive to the state 140, the clock 118 of the virtual machine 114 to a second rate of time lower than the first rate of time (e.g., lower than the host clock 108). The program instructions can be for causing the at least one processor 104 to perform, by the virtual machine 114, a subset of the plurality of operations 116 of the virtual machine 114 at the second rate of time (e.g., a rate of time that is reduced or lower from the rate of the host clock 108).

The first rate of time can be according to a clock 108 of the host device used to perform operations of the host device. The clock 134 of the emulator 132 can be used to perform operations of the emulator 132 on a test circuit 138. The state 140 of the clock 134 of the emulator 132 (e.g., simulation clock 134) can be one of a paused clock of the emulator or a stopped clock of the emulator.

Figure 3:
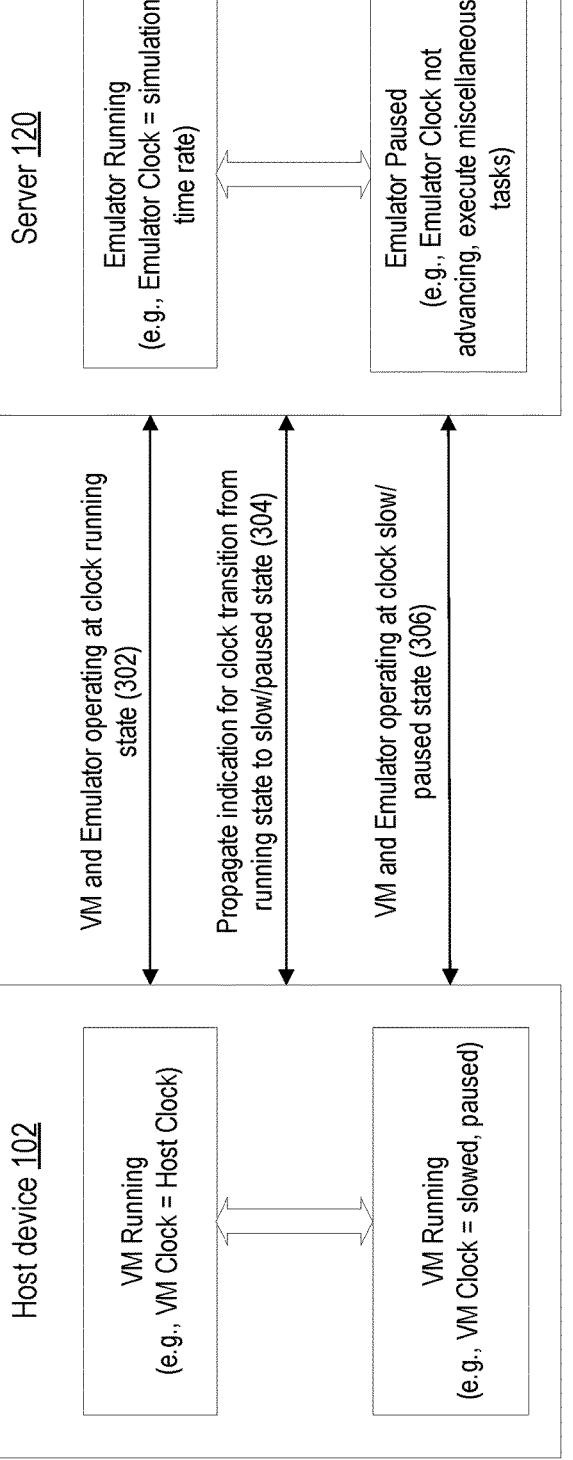
FIG. 3 is an example flow diagram of a method for adjusting the clock of a VM based on a change in a state of the emulator clock, according to some embodiments.

FIG. 3 is an example flow diagram of a method 300 for adjusting the VM clock 118 based on a change in a clock state 140 of the simulation clock 134, according to some embodiments. Method 300 can include acts 302 through 306 that can be implemented, for example, using the emulation system 100 of FIG. 1 and in view of the discussion in connection with plot 200 of FIG. 2. At 302, the method can include the VM and the emulator operating at a clock running state. At 304, the method can include propagating an indication for a clock transition from the running state to a slow/paused state. At 306, the method can include the VM and the emulator operating at the clock slow/paused state.

At 302, the method can include the VM and the emulator operating at a clock running state. The clock running state can correspond to the VM and the simulation clock rates operating at the rate of the host clock (e.g., the clock of the host device). The clock running state can correspond to the VM and the simulation clock rates operating set at a multiple of the host clock, such as 1.2, 1.5, 2, 3, 4, 5, 6, 8, or 10 times the host clock rate. The clock running state can correspond to the VM and the simulation clock rates operating at a rate that is a fraction of the host clock, such as 0.9, 0.8, 0.75, 0.6, 0.5, 0.4, 0.3, 0.25, 0.2, 0.1 or less than 0.1 times the host clock rate. The VM clock and the simulation clock rates can be set to any rate corresponding to, based on, or in association with the host clock.

At 304, the method can include propagating an indication for a clock transition from the running state to a slow/paused state. The indication can be generated from the emulator and can be propagated to the VM, via a virtual bridge channel established between the server executing the emulator and the host device executing the VM. Once received from the virtual bridge channel, the VM can determine or identify that the indication states, indicates or identifies that the state of the simulation clock is a stopped/paused (e.g., slow) state. The VM can determine, in response to the indication, that the clock state of the simulation clock has changed.

At 306, the method can include the VM and the emulator operating at the clock slow/paused state. Responsive to determining that the clock state of the simulation clock has changed (e.g., at 304), the VM can use the VM timer and/or virtualizer to set the VM clock at a rate that is lower than a prior rate of the VM clock. For example, the VM can set its VM clock from a prior rate corresponding to the rate of the host clock to a rate that is a fraction of the rate of the host clock (e.g., ½, ⅓, ¼, ⅙ or ⅛ of the rate of the host clock). Once set at a new (e.g., reduced), the VM and the emulator can each operate at the same slower (e.g., reduced) rate. Their rate of operation (e.g., VM clock and the simulation clock) can later be adjusted in response to other (e.g., future) notifications.

Figure 4:
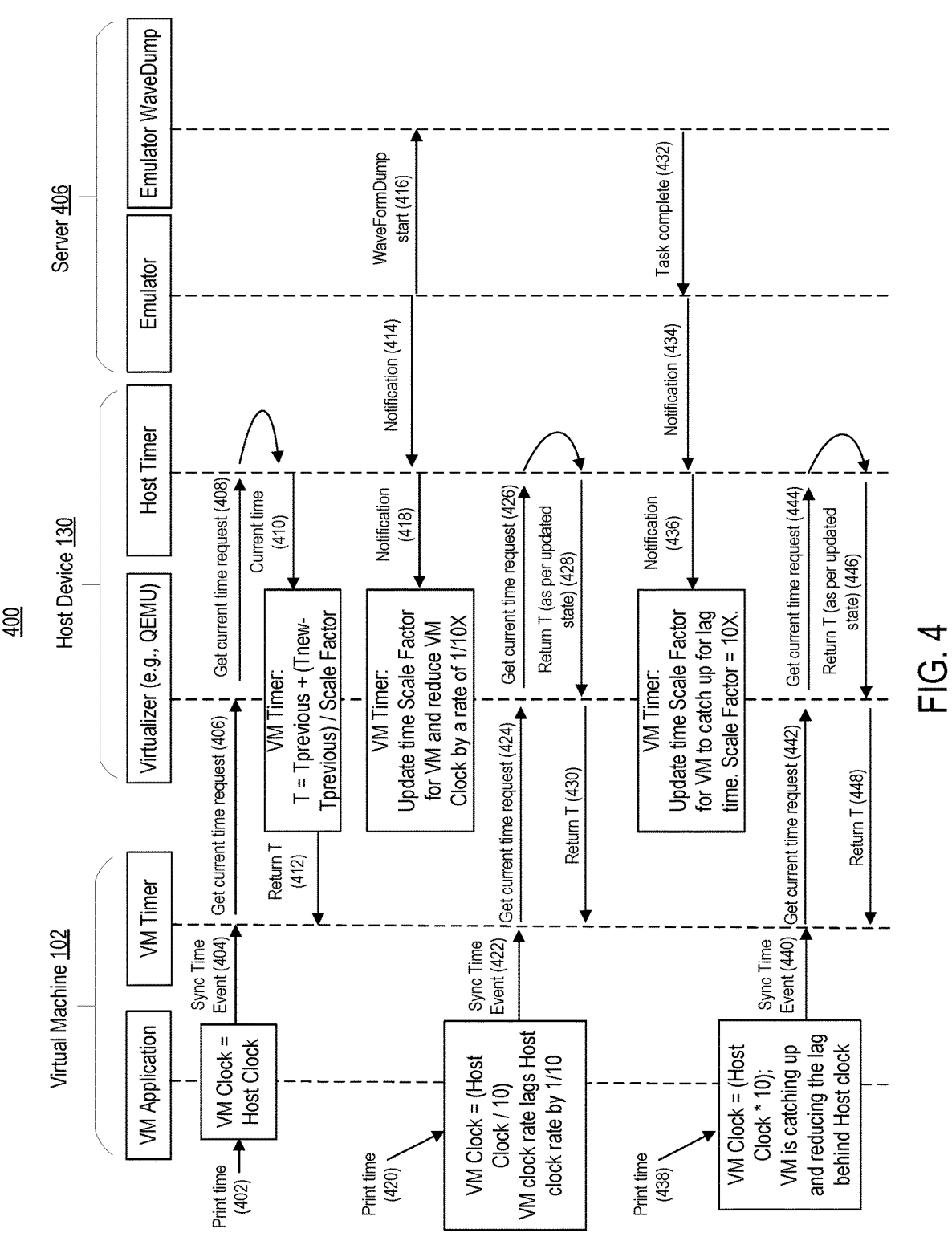
FIG. 4 is another example flow diagram of a method for adjusting the clock of a VM based on a series of changes in the state of the emulator clock, according to some embodiments.

FIG. 4 is another example flow diagram of a method 400 for adjusting the VM clock based on changes in the state of the emulator operation. Method 400 can include acts 402 through 448, which can be implemented, for example, using the emulation system 100 of FIG. 1 and in view of the discussions in connection with plot 200 of FIG. 2 and method 300 discussed in connection with FIG. 3. At 402, the method 400 can receive a print time message, triggering a sync time event at 404. At 406, the method can issue a get current time request, which can be forwarded to the host timer at 408. At 410, the method can provide the current time response, which at 412 can be forwarded or returned to the VM timer, completing a time sync. At 414, a notification can be issued from the emulator, while at 416 the emulator is performing a Waveform dump function. At 418, the notification is forwarded to the virtualizer to adjust the VM clock to a new clock rate. At 420, a second print time message can be received, triggering a second sync time event at 422. At 424, a get current time request is issued and forwarded to the host time at 426. At 428, the response to the get current time request is generated and forwarded to the VM timer at 430. At 432, a Waveform dump function is competed, while at 434 notification is generated by the emulator, which at 436 is received by the virtualizer to adjust the VM clock. At 438, a third print time is generated, causing a third sync time event at 440. At 442, get current time request is generated, which is forwarded to the host timer at 444. At 446, the response to the current time request is returned, which is forwarded to the VM timer at 448, notifying the VM timer of the adjustment.

At 402, the method 400 can receive, identify and/or generate a print time message. The print message can initiate a synchronization action or event to verify, monitor, adjust or synchronize the clocks of the VM and the Host. For example, the operating system of the VM can send a print time message or a request to the VM application, such as, based on an event or periodically. For example, the print time message can be generated by the VM application. The VM application can determine that the VM clock is equal to the Host clock, or that the VM and host clocks are synchronized.

At 404, a sync time event can be initiated or triggered. The sync time event can be triggered or initiated by the VM application or the operating system of the VM. The sync time event can be triggered or initiated responsive to the print time message or request, such as the one at 402.

At 406, the method can issue a get current time request. VM timer can receive the sync time event from the VM timer. In response to the sync time event, the VM timer can generate or send a request to get the current time value. The request can include an instruction or utilize a function, such as, "getCurrentTimeFromHost ( )" The request can be sent to the virtualizer (e.g., QEMU).

At 408 the get current time request from the virtualizer can be forwarded to the host timer. The host timer can read the time value of the host clock and determine the current time value.

At 410, the method can provide the current time response. For example, the host timer can provide the current time value of the host clock to the virtualizer. For example, the virtualizer can utilize the VM timer to determine the new time value for the VM. For example, the virtualizer can use the VM timer to determine that the current time value is equal to a previous time value plus the difference between the new time value and the previous time value, where such a difference is divided by the scale factor. In the illustrated example, at this stage the scale factor can be equal to 1 and the VM clock remains equal to Host clock (e.g., the two operate at the same rate).

At 412, the current time response can be forwarded or returned to the VM timer, completing a time sync. The virtualizer can forward the current VM time value (e.g., determined at 410) to the VM timer. The VM timer can verify that the VM clock value is correct or, if needed, adjust the VM clock value according to the received new time value. Once the VM clock value is verified or adjusted to be in accordance with the new VM time value, the sync time event is completed.

At 414, a notification can be issued, generated or sent by the emulator. The notification can indicate or identify that the simulation clock of the emulator is stopped or paused. For example, the notification can indicate or identify that the clock state of the simulation clock has changed from active/running to stopped/paused. Notification can be generated responsive to the emulator determining that an instruction received is for a blocking transaction. The blocking transaction can be a transaction or process that will stop or pause the processing of the emulator or communication via the channel between the emulator and the VM for a period of time. The Notification can be generated responsive to the emulator performing a WaveForm Dump function or any other operation of the emulator causing delay in performance of the blocking transaction, such as the read memory transaction.

At 416, the emulator can perform a time-consuming or resource-intensive function or operation that can prevent the emulator from immediately completing the blocking transaction, such as a Waveform dump function. The WaveDump function can include an operating system function for generating waveforms. The emulator can perform a time-consuming and/or resource intensive transaction or operation at the moment when the request for a blocking transaction is received. In some embodiments, the notification is issued responsive to the blocking transaction being initiated during the time-consuming or resource-intensive function or operation of the emulator.

At 418, the notification can be forwarded to the virtualizer to adjust the VM clock to a new clock rate. For example, the host timer can receive the notification from the emulator and send the notification to the virtualizer (e.g., QEMU). The virtualizer and/or VM timer can update the time scale factor responsive to the notification. The virtualizer and/or VM timer can, for example, reduce the VM clock by a set rate. In the illustrated example, the set rate by which the VM clock is reduced with respect to the host clock is $\frac{1}{10}$. Depending on the design, the clock rate can be reduced by any value, such as $\frac{1}{100}$, $\frac{1}{50}$, $\frac{1}{25}$, $\frac{1}{15}$, $\frac{1}{10}$, $\frac{1}{5}$, $\frac{1}{3}$, $\frac{1}{2}$, 1.2, 1.5, 1.8, 2, 2.5, 3, 4, 5, 7, 8, 10, 15, 20, 25, 30, 40, 50, 75, 100, or any other value greater or less than 1.

At 420, a second print time message can be received, triggering a second sync time event at 422. The second print time message can include any embodiments, features or characteristics, such as those described in connection with act 402, while actions at sync time event 422 can include any embodiments, features or characteristics, such as those described in connection with act 422.

At 424, a get current time request can be issued. This act can be implemented using any embodiments and techniques similar to those already described earlier and in connection with act 406.

At 426, the get current time request can be forwarded to the host time. This act can be implemented using any embodiments and techniques similar to those already described earlier and in connection with acts 408.

At 428, the response to the get current time request is generated. This act can be implemented using any embodiments and techniques similar to those already described earlier and in connection with act 410. Similar to act 410, the virtualizer and/or VM timer can read the current time value. However, in this case, the VM clock value will now be reduced from the Host clock since the rate of the VM clock has been reduced with respect to the Host clock earlier at act 418.

At 430, the response to the get current time request can be forwarded to the VM timer at 430, completing the second sync time event. This act can be implemented using any embodiments and techniques similar to those already described earlier and in connection with act 412.

At 432, a time-consuming or resource-intensive action (e.g., the Waveform dump function) can now be competed by the emulator. Following a time period of the simulation clock being stopped or paused (e.g., 5, 10, 15, 50, 100 or more than 100 milliseconds), the task of the emulator can now be completed. This can, in turn, allow to the emulator to turn to the blocking transaction, allowing the simulation clock to now be adjusted again (e.g., to a higher rate).

At 434, a second notification can be generated by the emulator. The second notification can include the notification that the clock state of the simulation clock is now changed to active/running (e.g., from stopped/paused).

At 436, the second notification can be received by the virtualizer to adjust the VM clock. The virtualizer and/or VM timer can update the scale factor for VM in order to increase the VM clock rate with respect to the Host clock rate. For example, the virtualizer and/or VM timer can make the VM clock rate equal to the host clock rate, such that the two clock rates increase at the same (e.g., offset) rate. For example, the virtualizer and/or VM timer can make the VM clock rate greater than the Host clock rate such that the VM clock rate catches up the to Host clock rate.

At 438, a third print time message can be generated. This act can be implemented using any embodiments and techniques similar to those already described earlier and in connection with act 420.

At 440, a third sync time event can be generated. This act can be implemented using any embodiments and techniques similar to those already described earlier and in connection with act 422.

At 442, get current time request can be generated. This act can be implemented using any embodiments and techniques similar to those already described earlier and in connection with act 424.

At 444, the get current time request can be forwarded to the host timer. This act can be implemented using any embodiments and techniques similar to those already described earlier and in connection with act 426.

At 446, the response to the current time request can be returned. This act can be implemented using any embodiments and techniques similar to those already described earlier and in connection with act 428.

At 448, the response to the get current time can be forwarded to the VM timer at 448, notifying the VM timer of the adjustment. This act can be implemented using any embodiments and techniques similar to those already described earlier and in connection with act 430. Using the latest updated current time for the VM timer, the VM can continue interacting with the emulator at the latest clock rate.

Figure 5:
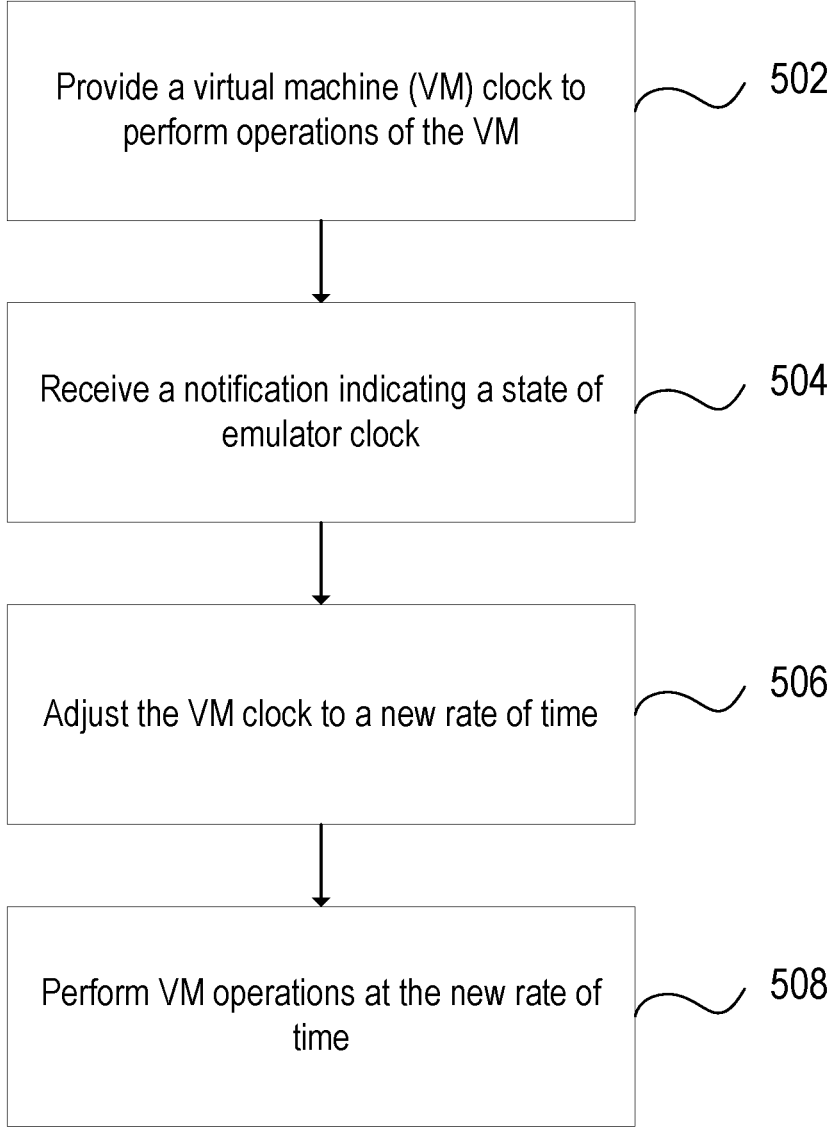
FIG. 5 is another example flow diagram of a method for adjusting the clock of a VM based on the changes in the state of the emulator timing operation, according to some embodiments.

FIG. 5 is an example flow diagram of a method 500 for adjusting the clock of a VM based on the changes in the state of the emulator operation, according to some embodiments. The method 500 can for adjusting a clock of a virtual machine based on a clock of an emulator. The method 500 can be implemented using the system 100 and in accordance with the embodiments discussed in connection with FIGS. 1-4. The method 500 can include providing a clock of a virtual machine (VM) to perform operations of the VM (502). The method 500 can include receiving a notification indicating a state of the emulator clock (504). The method 500 can include adjusting the VM clock to a new rate of time (506). The method 500 can include performing VM operations at the new rate of time (508).

At 502, one or more processors of a virtual machine can provide a clock of the virtual machine (VM) to perform operations of the VM. The one or more processors of the virtual machine can include one or more processors of the host device executing the VM according to instructions stored in memory of the host device. The method can include the one or more processors of the VM coupled with memory of the host device providing a clock of the VM to perform a plurality of operations of the VM at a first rate of time. The plurality of operations can include any number of acts or steps in testing, verifying or emulating the test circuit. The first rate of time can include the rate of time of the host clock. For example, the operation of the VM can be implemented by the one or more processors at a VM clock that is synchronized (e.g., set to be equal to) to the clock of the host device, such that that the first rate of time can be according to a clock of the host device used to perform operations of the host device The one or more processors can transmit an instruction for the emulator to read a value stored in a memory of the server. For example, the instruction to read the value stored in the memory (e.g., location in a memory or storage device) can be transmitted via a channel established between the host device and the server. The one or more processors can transmit an instruction for the emulator to read a value stored in a memory of the server executing the emulator, a memory of another device (e.g., host device, virtual machine or any other device), or a memory location storing information on a test circuit being processed by the emulator.

At 504, the one or more processors can receive from a server executing an emulator a notification indicating a state of the emulator clock. The one or more processors can receive a notification indicating a state of the clock of the emulator form the server executing the emulator. The notification can be received via a channel established between the host device executing the VM and the server executing the emulator. The channel can include a virtual bridge channel. The channel can include a virtual bridge client on the host device, a virtual bridge server agent on the server and/or AVIP to more efficiently interface with the test circuit processed by the emulator.

The clock of the virtual machine can perform the one or more operations for the test function of the virtual machine corresponding to the test circuit emulated by the emulator on the server. The test function can include any function, instruction or operation of the VM corresponding to the emulation, testing or verification of the test circuit. For example, the test function can include a blocking transaction, such as a memory read transaction to read a value in a memory location. For example, the test function can include a non-blocking transaction, such as a write memory transaction to write to a memory location.

The clock of the emulator can be used to perform operations of the emulator on the test circuit. For example, the clock of the emulator can include a simulation clock, which can represent clock instances with respect to the progress in the emulation or simulation of the test circuit. The state of the clock of the emulator can include one of a paused clock of the emulator or a stopped clock of the emulator (e.g., simulation clock). The state of the clock of the emulator can also include one of an active or running clock of the emulator (e.g., simulation clock). The one or more processors can receive from an emulator a second notification. The second notification can indicate a second state of the clock of the emulator. The second state of the clock of the emulator can correspond to the clock of the emulator being resumed.

At 506, the one or more processors can include adjusting the VM clock to a new rate of time. The one or more processors can adjust the clock of the VM to a second rate of time lower than the first rate of time responsive to the state of the emulator clock. The VM clock can be adjusted by the VM timer and/or virtualizer of the VM to update the VM clock with respect to the host clock. For example, the VM timer and/or virtualizer can increase the rate of the VM clock with respect to the host clock (e.g., by a factor of up to 1.1, 1.2, 1.5, 1.8, 2, 2.5, 3, 4, 5, 7, 8, 10, 15, 20, 30, 40, 50, 100 or more than 100). Similarly, VM timer and/or virtualizer can decrease the rate of the VM clock with respect to the host clock (e.g., by a factor of up to $9/10$, $4/5$, $3/4$, $2/3$, $1/2$, $1/3$, $1/4$, $1/5$, $1/6$, $1/8$, $1/10$, $1/15$, $1/20$, $1/30$, $1/50$, $1/100$ or less than $1/100$).

The one or more processors can adjust the clock of the VM, responsive to the state of the emulator clock (e.g., simulation clock of the emulator), to a second rate of time lower than the first rate of time, or to a second rate of time higher than the first rate of time. For example, if a VM clock has previously been set to a rate that is lower than the rate of host clock, then the VM clock can be increased in response to the notification that the state of the emulator clock (e.g., simulation clock) is now active or running. For example, if a VM clock has previously been set to a rate that is the same as or higher than the rate of host clock, then the VM clock can be decreased in response to the notification that the state of the emulator clock (e.g., simulation clock) is now paused or stopped.

For example, the one or more processors can adjust the clock of the virtual machine to a second rate of time lower than the first rate of time, responsive to the notification from the emulator. The one or more processors can receive, from the emulator, a second notification indicating a second state of the clock of the emulator. The second state can correspond to the clock of the emulator being resumed (e.g., set to active or running state). The one or more processors can adjust, responsive to the second state, the clock of the VM to the first rate of time (e.g., the rate of the host device clock).

The one or more processors can adjust, responsive to the second state, the clock of the virtual machine to a third rate of time. The third rate of time can be a rate that is higher than the first rate of time (e.g., the rate of the host clock). In such instances, the VM clock can be set to a rate that is faster than the rate of the host clock (e.g., in order to catch up with the host clock once the VM clock has previously been operating at a reduced rate). For example, the one or more processors can determine that that a count of the clock of the virtual machine operating at the third rate of time (e.g., increased VM clock rate) has reached a count of the clock of the host device operating at the first rate of time (e.g., the host clock rate). The one or more processors can, responsive to such a determination, adjust the clock of the virtual machine to the first rate of time (e.g., the rate of the host clock). This can ensure that the VM clock and the host clock operate in sync when the VM clock count has caught up to the host clock count.

The one or more processors of the host device can receive, via the channel (e.g., virtual bridge channel) the value read from the memory location at the server. For example, the one or more processors can receive the value via the channel responsive to the updated (e.g., second) notification that the state of the clock of the emulator (e.g., simulation clock) is active or running, following a prior notification that the clock of the emulator was paused or stopped. The one or more processors can receive the notification responsive to a determination that the instruction is for a blocking transaction. The one or more processors can receive the second notification responsive to the blocking transaction being one of processed or completed by the emulator.

At 508, the method can include the one or more processors performing VM operations at the new rate of time. The method can include the one or more processors performing a subset of the plurality of operations of the virtual machine at the second rate of time. For example, upon resetting the rate of the VM clock, the VM and/or the emulator can continue processing the remaining operations of testing, verifying or emulating the test circuit at the new VM clock rate.

The one or more processors can perform a second subset of the plurality of operations of the virtual machine at the first rate of time. For example, the first rate of time can correspond to the rate of time of the host clock, and the VM can perform a subset of the operations at the rate of the host clock.

Once the VM clock and/or emulator clock (e.g., simulation clock) is changed to a third rate, such as a rate that is lower than the host clock (e.g., in response to the first notification), the one or more processors can perform a second subset of the plurality of the operations of the virtual machine at a different rate of time. For example, the one or more processors can perform the remaining operations on the test circuit at the rate of time that is lower than the host clock. Similarly, if the third rate of time corresponds to a VM clock rate being set to a rate that is higher than the rate of the host clock, then the third subset of the plurality of operations can be performed at a rate of time that is higher than the host clock. The VM clock rate operation at a higher rate than the host clock can continue until the VM clock rate count reaches the host clock count (e.g., until the VM cumulative clock count catches up to the cumulative host clock count). At that point, the VM timer and/or emulator can determine that the VM clock count has reached the host clock count and the VM clock can be set to a rate that is equal to the rate of the host clock, such as the first rate of time.

What is claimed is:

1. A system to adjust a clock of a virtual machine based on a clock of an emulator, the system comprising:
at least one processor coupled with memory and config-ured to:
provide, for a virtual machine on a host device, a clock of the virtual machine to perform a plurality of operations of the virtual machine at a first rate of time;
receive, by the host device from a server executing an emulator, a first notification indicating that a state of a clock of the emulator has transitioned to a paused state from a running state responsive to a blocking transac-tion;
adjust, by the virtual machine responsive to the first notification, the clock of the virtual machine to a second rate of time lower than the first rate of time by applying a scale factor to provide the second rate of time at a fraction of a rate of the clock of the virtual machine; and
perform, by the virtual machine, a first subset of the plurality of operations of the virtual machine at the second rate of time while the emulator is in the paused state;
receive, by the host device from the server, a second notification indicating that the state of the clock of the emulator has transitioned to the running state from the paused state;
adjust, by the virtual machine responsive to the second notification, the clock of the virtual machine to a third rate of time greater than the first rate of time, until a cumulative count of the clock of the virtual machine reaches a cumulative count of the clock of the host device; and
adjust, responsive to the cumulative count of the clock of the virtual machine reaching the cumulative count of the clock of the host device, the clock of the virtual machine to the first rate of time.

2. The system of claim 1, wherein the first rate of time is according to a clock of the host device used to perform operations of the host device and the clock of the emulator is used to perform operations of the emulator on a test circuit.

3. The system of claim 1, wherein the second rate of time is at least ten times lower than the first rate of time.

4. The system of claim 1, wherein the paused state corresponds to one of a paused clock of the emulator or a stopped clock of the emulator.

5. The system of claim 1, wherein the at least one processor is configured to:

receive, by the virtual machine from an emulator, the second notification; and perform, by the virtual machine, a second subset of the plurality of operations of the virtual machine at the third rate of time.

6. The system of claim 1, wherein the at least one processor is configured to:

determine that that cumulative count of the clock of the virtual machine has reached the cumulative count of the clock of the host; and adjust the clock of the virtual machine to the first rate of time, in response to the determination.

7. The system of claim 6, wherein the at least one processor is configured to:

perform, by the virtual machine, a second subset of the plurality of the operations of the virtual machine at the third rate of time until the cumulative count of the clock of the virtual machine reaches the cumulative count of the clock of the host device; and perform, by the virtual machine, a third subset of the plurality of the operations of the virtual machine at the third rate of time following the cumulative count of the clock of the virtual machine having reached the cumulative count of the clock of the host device.

8. The system of claim 1, wherein the clock of the virtual machine is to perform the plurality of operations for a test function of the virtual machine corresponding to a test circuit emulated by the emulator on the server.

9. The system of claim 1, wherein the at least one processor is configured to:

transmit, by the virtual machine via a channel established between the host device and the server, an instruction for the emulator to read a value stored in a memory of the server; and receive, by the virtual machine from the server, the value via the channel.

10. The system of claim 1, wherein the at least one processor is configured to:

transmit, by the virtual machine, an instruction for the emulator to read a value stored in a memory of the server; and receive, by the virtual machine from the server, the notification from the server responsive to a determination that the instruction is for a blocking transaction.

11. A method of adjusting a clock of a virtual machine based on a clock of an emulator, the method comprising:

providing, by one or more processors of virtual machine coupled with memory of a host device, the clock of the virtual machine to perform a plurality of operations of the virtual machine at a first rate of time corresponding to a rate of time of a clock of the host device;

receiving, by the one or more processors from a server executing an emulator, a first notification indicating that a state of a clock of the emulator has transitioned to a paused state from a running state responsive to a blocking transaction;

adjusting, by the one or more processors responsive to the first notification, the clock of the virtual machine to a second rate of time lower than the first rate of time by applying a scale factor to provide the second rate of time at a fraction of a rate of the clock of the virtual machine; and performing, by the one or more processors, a first subset of the plurality of operations of the virtual machine at the second rate of time while the emulator is in the paused state;

receiving, by the one or more processors, from the server, a second notification indicating that the state of the clock of the emulator has transitioned to the running state from the paused state;

adjusting, by the one or more processors responsive to the second notification, the clock of the virtual machine to a third rate of time greater than the first rate of time, until a cumulative count of the clock of the virtual machine reaches a cumulative count of the clock of the host device; and adjusting, by the one or more processors, responsive to the cumulative count of the clock of the virtual machine reaching the cumulative count of the clock of the host device, the clock of the virtual machine to the first rate of time.

12. The method of claim 11, wherein the first rate of time is equal to a clock of the host device used to perform operations of the host device, the clock of the emulator is used to perform operations of the emulator on a test circuit, and the state is generated responsive to a blocking transaction implemented by the emulator.

13. The method of claim 11, further comprising:

receiving, by the one or more processors from the emulator, the second notification; and performing, by the one or more processors, a second subset of the plurality of operations of the virtual machine at the third rate of time.

14. The method of claim 11, further comprising:

determining, by the one or more processors, that that cumulative count of the clock of the virtual machine has reached the cumulative count of the clock of the host; and adjusting, by the one or more processors, the clock of the virtual machine to the first rate of time, in response to the determination.

15. The method of claim 14, further comprising:

perform, by the virtual machine, a second subset of the plurality of the operations of the virtual machine at the third rate of time until the cumulative count of the clock of the virtual machine reaches the cumulative count of the clock of the host device; and performing, by the one or more processors, a third subset of the plurality of the operations of the virtual machine at the first rate of time following the cumulative count of the clock of the virtual machine having reached the cumulative count of the clock of the host device.

16. The method of claim 11, wherein the clock of the virtual machine is to perform the plurality of operations for a test function of the virtual machine corresponding to a test circuit emulated by the emulator on the server.

17. The method of claim 11, further comprising:

transmitting, by the one or more processors via a channel established between the host device and the server, an instruction for the emulator to read a value stored in a memory of the server; and receiving, by the one or more processors from the server, the value via the channel.

18. The method of claim 11, further comprising:

transmitting, by the one or more processors, an instruction for the emulator to read a value stored in a memory of the server; and receiving, by the one or more processors from the server, the notification from the server responsive to a determination that the instruction is for a blocking transaction.

19. A non-transitory computer readable medium storing program instructions for causing at least one processor to:

provide, for a virtual machine on a host device, a clock of the virtual machine to perform a plurality of operations of the virtual machine at a first rate of time;

receive, by the host device from a server executing an emulator, a first notification indicating that a state of a clock of the emulator has transitioned to a paused state from a running state responsive to a blocking transaction;

adjust, by the virtual machine responsive to the first notification, the clock of the virtual machine to a second rate of time lower than the first rate of time by applying a scale factor to provide the second rate of time at a fraction of a rate of the clock of the virtual machine; and perform, by the virtual machine, a first subset of the plurality of operations of the virtual machine at the second rate of time while the emulator is in the paused state;

receive, by the host device from the server, a second notification indicating that the state of the clock of the emulator has transitioned to the running state from the paused state;

adjust, by the virtual machine responsive to the second notification, the clock of the virtual machine to a third rate of time greater than the first rate of time, until a cumulative count of the clock of the virtual machine reaches a cumulative count of the clock of the host device; and adjust, responsive to the cumulative count of the clock of the virtual machine reaching the cumulative count of the clock of the host device, the clock of the virtual machine to the first rate of time.

20. The non-transitory computer readable medium of claim 19, wherein the first rate of time is according to a clock of the host device used to perform operations of the host device, the clock of the emulator is used to perform operations of the emulator on a test circuit, and the second rate of time is at least ten times lower than the first rate of time.

\* \* \* \* \*